United States Patent [19]

Stewart, Jr. et al.

[11] Patent Number: 4,606,495
[45] Date of Patent: Aug. 19, 1986

[54] UNIFORM BRAZE APPLICATION PROCESS

[75] Inventors: Robert C. Stewart, Jr., West Suffield; Carl K. Johnson, Manchester; Leonard J. Bonville, Jr., Marlborough, all of Conn.

[73] Assignee: United Technologies Corporation, Hartford, Conn.

[21] Appl. No.: 818,899

[22] Filed: Jan. 14, 1986

Related U.S. Application Data

[63] Continuation of Ser. No. 564,450, Dec. 22, 1983, abandoned.

[51] Int. Cl.⁴ .......................... B23K 1/04; B23K 1/12
[52] U.S. Cl. ....................................... 228/183; 228/22; 228/248; 228/181; 29/157.3 D; 29/DIG. 4
[58] Field of Search ............... 228/248, 183, 181, 256, 228/257, 22; 29/157.3 D, DIG. 4; 427/420

[56] References Cited

U.S. PATENT DOCUMENTS

| | | | |
|---|---|---|---|
| 2,996,407 | 8/1961 | Mecker | 117/66 |
| 3,222,775 | 12/1965 | Whitney | 29/497 |
| 3,656,224 | 4/1972 | Blair et al. | 29/471.1 |
| 3,967,045 | 6/1976 | Kurobe | 427/420 |
| 4,053,969 | 10/1977 | Bayard | 29/157.3 |

FOREIGN PATENT DOCUMENTS

57-88967 6/1982 Japan ........................ 228/263.11

*Primary Examiner*—Kenneth J. Ramsey
*Assistant Examiner*—Christopher L. McKee
*Attorney, Agent, or Firm*—Harry J. Gwinnell

[57] ABSTRACT

A method of forming thin, uniform braze joints is effected through the use of curtain coating. Braze powder is admixed with a liquid polymeric binder to form a slurry. The slurry is forced through the slots in a curtain coating head and deposited on at least one of the metal surfaces to be bonded together. The method has particular utility for bonding fin/plate sections of a heat exchanger where the fins have a U-shaped cross section. The slurry is deposited on the top portion of the fin and the side portion of the fin and wiped from the top portion leaving braze material primarily on the side wall portion. When the plates are contacted to the fins and heating performed, a bond is effected with maximum plate-to-fin contact for high heat transfer and a strong braze joint.

1 Claim, 3 Drawing Figures

U.S. Patent  Aug. 19, 1986  4,606,495

UNIFORM BRAZE APPLICATION PROCESS

This application is a continuation of application Ser. No. 564,450, filed Dec. 22, 1983, now abandoned.

DESCRIPTION

1. Technical Field

The field of art to which this invention pertains is application of brazing fillers, and specifically brazing used in heat exchanger components.

2. Background Art

Brazing is a common form of metal joining. Typically a filler metal or alloy is placed between two pieces of metal to be bonded and the temperature raised, typically above 400° C. to form a bond. The process is often an irreversable process with the filler metal or alloy forming an intermetallic solution with the metals being joined.

In a heat exchanger it is often necessary to stack hundreds of elements and bond them together. The braze joint quality must be high as the joint not only has a heat transfer function, but also provides a structual bond between the adjacent, repeating heat exchanger elements.

In order to produce a high quality braze joint such things as thicknesses of the braze application and the uniformity of thickness are critical. However, there is a constant trade-off in high quality and cost effectiveness. In order to accomplish such requirements and attain any semblance of a high production manufacturing method it has been common to mix the braze alloy or metal powders with a liquid plastic binder. A volatile binder is used which pyrolyzes without residue during the brazing or oven preheat cycle. The liquid binder allows for application in a production process by paint brush, spatula, spray, catridge gun, etc. However, there is great difficulty in using these processes in a production oriented manner to attain the high quality braze joint required in most applications, and particularly in heat exchanger applications where repeat elements may number in the hundreds per heat exchanger unit. For example, typically in the prior art thin (0.005 inch to 0.010 inch) sheets of braze material in a plastic binder or metal foil are cut and trimmed to fit the area to be brazed, and then inserted between the elements to be bonded. Cutting is laborious or requires special dies and tooling. The braze preforms can slip out of place and cause leaks and weak bond areas.

Accordingly, what is needed in this art is an improved method of forming braze joints which overcomes the problems of the prior art.

DISCLOSURE OF INVENTION

The present invention is directed to a method of forming a high quality, uniform braze joint between metal surfaces comprising admixing powdered metal or metal braze alloy with a liquid polymeric binder to form a slurry. The slurry is forced through the slot opening in a curtain coating head to form a thin vertical curtain of slurry. At least one of the metal surfaces to be bonded is passed, preferably on a conveyer belt, under the curtain coating head to form a thin, uniform layer of braze powder and binder on the metal surfaces. The metal surfaces to be bonded are next placed together and heated to drive off the polymeric binder and melt the braze powder to bond the surfaces together.

Another aspect of the invention includes applying such braze slurry to heat exchanger elements having a U-shaped cross section including a top portion and a side wall portion. After application of the slurry to the top portion and side wall portion the heat exchanger elements are passed under a squeegee element which wipes substantially all of the slurry off of the top portion, leaving such slurry only on the side wall portion. When the heat exchanger elements are subsequently stacked one on top of the other and heated to form a bond there is substantially no braze material on the top portion and only the braze material on the side wall portion effects the bond.

The foregoing and other features and advantages of the present invention will become more apparent from the following description and accompanying drawings.

BEST MODE FOR CARRYING OUT THE INVENTION

Figure 1:
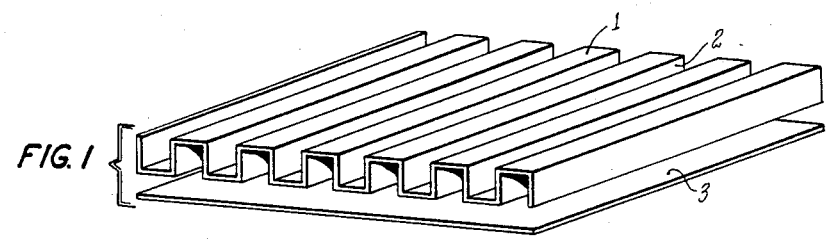
FIG. 1 shows a typical fin and plate system of a typical heat exchanger.

As the braze material any powdered metal or metal braze alloy compatible with and conventionally used with particular metal materials to be bonded may be used. The only requirements are that the binder has sufficient viscosity and surface tension to be able to be deposited out of a curtain coater and that the powdered metal or metal braze alloy have a particle size such that it will be suspended while the binder is pumped through the curtain coater. Conventional nickel, chromium, silver etc. braze powders having a mesh size of approximately 180 have typically been used, such as the nickel alloy braze powder Amdry Alloy BNI 5 from Alloy Metals, Incorporated.

The liquid polymeric binder with which the braze powder is mixed is a polymer which volatilizes at or below the brazing temperature of the metal. Cellulose nitrate lacquers are also particularly suitable for this purpose. These lacquers burn clean leaving no significant ash or pyrolysis products. There is also sufficient oxygen present in cellulose nitrate compounds to oxidize any carbon present even in a reducing atmosphere. A suitable polymeric binder is Nicrobraze Cement with a viscosity of 200 cps available from Wall Colmonoy Corporation.

Typically the binder will contain solvents (such as ketones, higher alcohols such as n-butanol, etc.) plasticizers (for cellulose nitrate the plasticizer will typically be camphor) and diluents (such as ethyl alcohol). Methyl ethyl ketone, ethyl acetate and Cellosolve are particularly good solvents for cellulose nitrate. Viscosity is controlled by the concentration of the binder and the amounts of solvent and diluent. The plasticizer provides flexibility to the binder. Controlling viscosity by the interrelationship of these materials is conventional in this art.

Commercial curtain coating apparatus can be used to deposit the braze slurry on the metal substrates to be coated, e.g. available from Koating Machinery Co., Inc. or Ashdeel Steinemann Curtain Coaters. In such apparatus the thickness of the curtain or waterfall of brazed slurry is determined by two precision ground knife blades. The gap or slot is variable in width to adapt to the properties of the slurry being used such as size of the particles, viscosity, solids content and surface tension.

Exemplary slot widths are 30 mils to 60 mils although other widths can be used depending on the slurrys being deposited. Typically, a slurry head height of about 6 inches was maintained above the slot opening. A head height of less than 3 inches resulted in an irregular flow for those slurrys tested. Pneumatic pressure may be used above the slurry surface to alter its flow characteristics through the slot, (e.g. up to 4 psi) especially with higher viscosity slurry material. Typically slurrys tested had viscosities ranging from about 450 to 500 cps and solids contents about 40% by weight.

The interdependent variables which determine the thicknesses of the coatings deposited, the uniformity of the coatings, and the rate of coating are the viscosity of the slurry, the braze solids content, the solids content in general of the slurry, the flow rate of the slurry, the head pressure used in the curtain coating apparatus, the slot width, and the speed at which the substrate material is passed under the curtain. The easiest way to control coating thickness and uniformity is by controlling the speed at which the parts to be coated pass through the curtain and holding all else constant. Once coated the slurry is dried on the part to be bonded either by ambient air drying or heating (e.g. at 100° F. to 125° F.). Once the braze material has been thus deposited the metal parts may be placed together and heated to effect the bond as is conventionally done in this art (e.g. heating to about 1950° F.).

EXAMPLE

A nickel based powder braze (Amdry Alloy BNI 5) having a particle size of about 180 mesh was admixed with Nicrobraze Cement having a viscosity of about 200 cps in organic solvent. Mixing can be effected either in a ball mill (without balls) or in a conventional, low shear stirring mixer. The resulting composition had a viscosity of about 450 cps to about 500 cps and a solids content of about 40% by weight. After mixing, the material was loaded into a conventional Koating Machinery Company, Inc. 60 inch curtain coater. The slot opening of the curtain coater was maintained about 6 inches above 18 inch by 26 inch stamped, heat exchanger component plates which were passed under the curtain coater at a rate of about 2½ seconds per part, or 100 parts per hours. The head pressure of the curtain coater was approximately 0.5 psi and the slot width was approximately 35 mils. Braze layer thicknessess ranging anywhere from 0.002 inch to 0.005 inch were produced with a tolerance range per application within ±0.00025 inch. Similar parts manufactured by conventional methods such as spraying or brush coating took 12 minutes per part, representing a savings of approximately 99% of man hours for production braze application.

An alternative method of utilizing the system of the present invention is to mask off areas to remain free of braze using a sprayable film forming material or film forming resist using screen printing or stencil techniques. After applying the braze material the resist etc. could be stripped away leaving those areas braze free.

Figure 2:
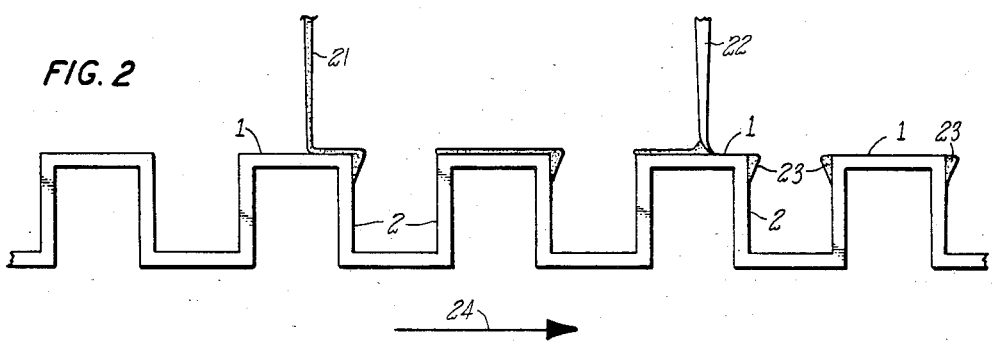
FIG. 2 shows the wiping of the slurry material from the top portion of a typical heat exchanger element.
Figure 3:
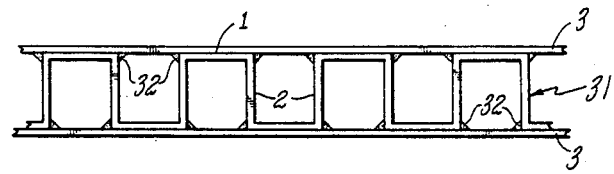
FIG. 3 shows a typical fin and plate assembly of a heat exchanger element after the formation of the braze joint.

A particularly useful application of the method according to the present invention is in the making of typical fin/plate heat exchangers, as shown in the accompanying drawings. In FIG. 1 a typical fin/plate heat exchanger having a U-shaped cross section including a top portion 1 and a side wall portion 2 is shown prior to bonding to plate section 3. In FIG. 2 the slurry curtain 21 is deposited on the top portion 1 of the fin and side portion 2. It is then removed from the top portion 1 by use of a squeegee blade 22 (or comparable means) leaving braze slurry fillets 23 only on the side portions 2 of the fin (also filling in any depressions on the top portion for better heat transfer). Fin movement under the curtain is shown by arrow 24. The speed of the substrate 1 in FIG. 2 and the flow rate of the slurry curtain 21 are coordinated such that the fillet formed on a leading edge from the falling curtain and the fillet formed on the trailing edge by the action of the squeegee blade 22 are approximately equal in size. After bonding as shown in FIG. 3 there is minimal braze material on the top portion 1 of the fin (e.g. that drawn into the contact surfaces of the fin and plate by the wetting action of the braze) resulting in minimum gap spacing between the fin 31 and the plates 3. The fused braze 32 is also shown.

In manufacture the fins may be coated on one side and then turned over and coated on the other side. The entire process could be automated so that no handling would be involved.

It should be noted, that although a specific example has been shown for a fin-plate assembly in a heat exchanger that other parts, e.g. manifolds could also be bonded in like manner. Furthermore, the parts could be coated and stored and it is not necessary to coat and bond at the same time.

Not only does the disclosed method result in greater speed of application of braze material to elements to be bonded, but thinner coatings can be applied (minimizing amount of braze material used) and more uniform coatings (increasing braze quality) can be applied than is typical in this art.

Although this invention has been shown and described with respect to detailed embodiments thereof, it will be understood by those skilled in the art that various changes in form and detail thereof may be made without departing from the spirit and scope of the claimed invention.

We claim:

1. A method of forming high quality braze joints between metal surfaces and U-shaped cross-section heat exchanger fins having a top portion and a side wall portion, comprising admixing powdered metal or alloy braze with a liquid polymeric binder to form a slurry, forcing the slurry through a curtain coating head to form a thin vertical curtain of the slurry, depositing the curtain onto the top portion of the heat exchanger fins by passing such fins under the curtain, wiping the slurry from the top portion of the fins with a squeegee blade to produce slurry fillets approximately equal in size on the side portions of the fins which form braze joints when contacted with the metal surfaces to be bonded, placing the metal surfaces to be bonded to the fins against the top portion of the fins in contact with the fillet, and heating the contacted surfaces to effect the bond and form the braze joints.

* * * * *